3,231,622
REACTION PRODUCTS OF DECABORANE AND ETHYLENE
Hugo Stange, and Joel A. Zaslowsky, Niagara Falls, N.Y., assignors, by mesne assignments, to Olin Mathieson Chemical Corporation, a corporation of Virginia
No Drawing. Filed June 8, 1955, Ser. No. 514,121
2 Claims. (Cl. 260—606.5)

This application is a continuation-in-part of our co-pending application Serial No. 422,968, filed April 13, 1954, now abandoned.

This invention relates to new compositions of matter which are reaction products of decaborane and ethylene and to a method for their production.

It is known in the art to prepare decaborane. The material is a stable, white crystalline solid which melts at 99.5° C. and which boils at 213° C. Decaborane is a boron hydride of very high boron content, and has a very high heat of combustion, indicating its utility as a high energy fuel. Being a solid, however, decaborane is not conveniently handled and this detracts from its utility for fuel purposes.

In accordance with the present invention, it has been discovered that decaborane and ethylene can be reacted to form a liquid material of high boron content, of the order of 50 percent or 70 percent or more by weight of boron. This material, in addition, is stable and has a low vapor pressure, and in view of its various properties it is a conveniently handled, high energy fuel.

A specific chemical compound which can be prepared in accordance with our invention is monoethyldecaborane.

The following examples illustrate in detail the preparation of various decaborane-ethylene reaction products of the present invention and are to be considered not limitative thereof.

EXAMPLE I

Decaborane (molecular weight 122.3), 13 grams, was charged into a rocking autoclave (110 ml. capacity) and ethylene was pumped in until the pressure registered 2150 p.s.i.g. at 18° C. The decaborane, as added, was a white granular solid. The autoclave was heated electrically. The autoclave rocker was turned on and heat was applied to the jacket; in 2 hours the pressure and temperature rose to 10,025 p.s.i.g. and 205° C. respectively. After 6 hours the pressure had fallen to 7950 p.s.i.g., and the electrical heating was stopped. The bomb, after being allowed to cool to room temperature, was vented to remove excess ethylene and then emptied in a nitrogen-filled dry box. A liquid product was obtained from the bomb. Decaborane was removed from the crude product by filtration and 13 grams of a brown liquid product was obtained. This material was non-pyrophoric and contained 58% boron by weight by analysis. The product was then heated under vacuum at 100° C. for 4 hours in an attempt to remove dissolved decaborane by sublimation. Analysis at the end of the heating period revealed a boron content of 57% by weight. The heat of combustion of the material which had been subjected to the heating process was determined and found to be 25,000 B.t.u. The liquid products approximated closely in boron content the addition product of one mole of decaborane and two moles of ethylene (theoretical boron, 60.7% by weight).

EXAMPLE II

Decaborane (13 grams) was charged to the autoclave bomb used in Example I and ethylene was pumped in to a pressure of 2400 p.s.i.g. at 25° C. Then heat was applied and the rocking mechanism started. After 2 hours the temperature had reached 204° C. with a corresponding pressure of 9300 p.s.i.g. After 6 hours the heating was discontinued and the bomb was allowed to cool to room temperature. The bomb was vented to remove excess ethylene and the liquid products were removed from the bomb in a nitrogen-filled dry box. The crude material was filtered as described in Example I and 10 grams of brown liquid product was obtained. This liquid, which was also non-pyrophoric, was found to contain 51% boron by weight by analysis.

EXAMPLE III

Twenty grams of decaborane was charged to the autoclave used in Example I and ethylene was pumped in to a pressure of 2400 p.s.i.g. at 25° C. Then heat was applied and the rocking mechanism started. After 2 hours the temperature had risen to 206° C. with a corresponding pressure of 10,000 p.s.i.g. Heating was stopped at the end of 6 hours and the bomb was allowed to cool to room temperature. After venting, the bomb was emptied in a nitrogen-filled dry box. As in the previous examples, the solid decaborane was removed from the product by filtration and 31 grams of a brown liquid product were obtained. This material was non-pyrophoric as in previous examples and contained 48% boron by weight by analysis.

The liquid products from this and Example II were combined and distilled through a small column; two fractions were obtained along with a solid residue. The first fraction (approximately 15 grams by weight) boiled between 65–74° C. under an absolute pressure of 3–5 mm. of mercury; it analyzed 66.8% boron by weight and had a $n_D{}^{25}$ of 1.5542. The second fraction (approximately 10 grams by weight) boiled over a range of 74–80° C. under an absolute pressure of 3–5 mm. of mercury; it analyzed 58.4% boron by weight and had a $n_D{}^{25}$ of 1.5480. When cooled, this material did not completely solidify at temperatures as low as —78° C. The density of the second fraction was determined and found to be 0.85 at 77° F.

EXAMPLE IV 20 grams of decaborane of about 90 percent by weight purity obtained from the solids produced in the pyrolysis of diborane to produce pentaborane was added to a 110 ml. stainless steel Aminco autoclave which was sealed and placed in a rocking mechanism. Ethylene was then pressured into the autoclave until the pressure reached 1200 p.s.i.g. at 23° C. The heater and rocker were then turned on.

LOG OF REACTION

| Time, A.M. | Temp., ° C. | Pressure, p.s.i.g. |
|---|---|---|
| 9:10 | 23 | 1,200 |
| 9:45 | 142 | 2,750 |
| 9:55 | 190 | 3,400 |
| 10:00 | 203 | 3,600 |

The heater was turned off at 4:00 p.m., the reaction having been conducted at 203° C. for six hours. After the autoclave had been allowed to cool overnight, 30 grams of brown liquid (a slurry) was recovered and filtered. Analysis of the filtered product showed that it contained 54.50 percent by weight of boron.

This procedure was repeated 12 times using 20 grams of the decaborane, an initial ethylene pressure of 1200–

1300 p.s.i.g. at 23° C., a reaction temperature of 195–205° C. and a reaction time of four to six hours to produce filtered products containing 44.2–54.5 precent by weight or boron.

The filtrates produced in the 13 runs having a total combined weight of 246 grams were bulked and the combined sample was heated in vacuum to remove dissolved decaborane by sublimation and then subjected to simple distillation. Cut C of the first distillation which weighed 80.7 grams (64 percent by weight boron) and which came over at 67–83° C. (vapor temperature) at an absolute pressure of 0.6 mm. of mercury was subjected to a second simple distillation. The main fraction of the second distillation came over at 52–66° C. (vapor temperature) at an absolute pressure of 0.3 mm. of mercury and weighed 67.7 grams. This main fraction was a liquid and contained a large proportion of monoethyldecaborane, inasmuch as it had a boron content of 65 percent by weight (71.96 percent theoretical) and a molecular weight of 147 (150.4 theoretical). It had the following properties.

| Property: | Value |
|---|---|
| Density, in g./ml: | |
| At 20°/4° C. | 0.828 |
| At 25°/4° C. | 0.822 |
| Viscosity, in centistokes: | |
| At 25° C. | 6.5 |
| At 0° C. | 14.3 |
| At −40° C. | 110 |
| Refractive index, $n_D^{25}$ | 1.5508 |
| Vapor pressure at 25° C., in mm. | 1.5 |
| Freezing point, ° C. | <−78 |

Table I sets forth further information concerning this experimental work.

TABLE I

| Fraction | Wt., g. | B.P., ° C. | Percent boron | Molecular weight |
|---|---|---|---|---|
| 1st distillation: | | | | |
| Decaborane | 15 | | | |
| Cut—A | 5 | 58–65/1 mm | | |
| B | 12 | 65–74/1 mm | | |
| C | 80.7 | 67–83/0.6 mm | 64 | |
| D | 8.8 | 83–89/0.8 mm | 57 | |
| E | 4.8 | 95–108/1–2 mm | 52 | |
| Residue A | 92 | Resinous, nonvolatile. | 41 | |
| 2nd distillation (Cut C): | | | | |
| Decaborane | 1–2 | | | |
| Main fraction | 67.7 | 52–66/0.3 mm | 65 | 147 |
| Residue, B | 10 | | | |
| 3rd distillation (Cuts D, E, Residue B): | | | | |
| Cut— | | | | |
| AA | 10.1 | 68–74/0.2 mm | 58 | 191 |
| BB | 6.4 | 74–83/0.3 mm | 56 | 200 |
| Residue C | 6 | Liquid | 47 | |

*Example V*

Decaborane, 20 grams of about 90 percent by weight purity, obtained from solids produced in the conversion of diborane to pentaborane, was added to a 110 ml. stainless steel Aminco autoclave which was then sealed. Ethylene was pressured into the autoclave until the pressure reached 1200 p.s.i.g. at 23° C. The heater and rocking mechanism were turned on.

LOG OF REACTION

| Time | Temp., ° C. | Pressure, p.s.i.g. |
|---|---|---|
| ¹8:55 | 23 | 1,200 |
| 9:35 | 146 | 2,300 |
| 9:45 | 190 | 2,600 |
| 9:50 | 202 | 2,700 |
| ²4:00 | 202 | (³) |

¹ A.M.  ² P.M.  ³ Not measured.

The heat was shut off at 4:00 p.m.; the reaction time was 6 hours at 202° C. After the autoclave had cooled, 32 g. of brown liquid product was recovered.

This procedure was substantially repeated 19 times using the conditions set forth in Table II.

TABLE II

| $B_{10}H_{14}$ added, grams | Ethylene pressure, p.s.i.g. | Temp., ° C. | Exp. time, hrs. | Volume autoclave, ml. |
|---|---|---|---|---|
| 20 | 1,200 | 200 | 6 | 110 |
| 20 | 1,200 | 200 | 6 | 110 |
| 20 | 1,200 | 200 | 6 | 110 |
| 20 | 1,200 | 199 | 6 | 110 |
| 20 | 1,400 | 200 | 6 | 110 |
| 20 | 1,400 | 199 | 6 | 110 |
| 20 | 1,400 | 200 | 6 | 110 |
| 40 | 1,050 | 199 | 6 | 300 |
| 20 | 1,100 | 203 | 6 | 300 |
| 20 | 1–100 | 198 | 6 | 300 |
| 20 | 1,150 | 201 | 6 | 110 |
| 20 | 1,100 | 204 | 6 | 300 |
| 20 | 1,100 | 200 | 6 | 300 |
| 20 | 1,100 | 204 | 12 | 300 |
| 20 | 1,050 | 201 | 6 | 300 |
| 20 | 1,200 | 193 | 6 | 300 |
| 20 | 1,250 | 203 | 6 | 110 |
| 20 | 1,100 | 204 | 6 | 300 |
| 20 | 1,100 | 202 | 2 | 110 |

The 20 reaction products were bulked to provide 564 grams of material which yielded 518 grams of filtrate. This filtrate was subjected to two simple distillations with the results shown in Table III. Distillate AA contained a large proportion of monoethyldecaborane as shown by its boron content.

TABLE III

| Fraction | Wt., g. | B.P., ° C. | Percent boron |
|---|---|---|---|
| Crude product | 518 | | 54 |
| 1st distillation crude: | | | |
| Decaborane | 120 | | |
| Distillate A | 174 | 66–111°/0.4–2.5 mm | 62 |
| Residue A | 200 | Resinous, nonvolatile | |
| 2nd distillation (Distillate A): | | | |
| Distillate AA | 137 | 54–61/0.2 mm | 64 |
| Residue B | 37 | | 57 |

EXAMPLE VI

Decaborane (20 grams of about 90 percent by weight purity obtained from the solids formed in the pyrolysis of diborane to produce pentaborane) was added to a 110 ml. stainless steel autoclave which was then sealed. Ethylene was pressured in until the pressure was 1100 p.s.i.g. at 23° C. Next the stirrer and rocking mechanism were turned on.

LOG OF REACTION

| Time | Temp., ° C. | Pressure, p.s.i.g. |
|---|---|---|
| ¹5:30 | 23 | 1,100 |
| 6:10 | 180 | 2,300 |
| 6:35 | 198 | 2,300 |
| ²12:30 | 198 | |

¹ P.M.  ² A.M.

The heat was shut off at 12:30 a.m.; the reaction time was 6 hours at 198° C. This procedure was substantially repeated thirteen times using the conditions set forth in Table IV.

TABLE IV

| $B_{10}H_{14}$ added, grams | Ethylene pressure, p.s.i.g. | Temp., ° C. | Exp. time, hrs. | Volume autoclave, ml. |
|---|---|---|---|---|
| 20 | 1,100 | 201 | 6 | 300 |
| 20 | 1,200 | 200 | 6 | 110 |
| 20 | 1,200 | 201 | 6 | 110 |
| 20 | 1,100 | 200 | 2 | 110 |
| 20 | 1,150 | 200 | 6 | 300 |
| 20 | 1,100 | 200 | 6 | 300 |
| 20 | 1,200 | 200 | 6 | 110 |
| 20 | 1,200 | 204 | 6 | 110 |
| 20 | 1,150 | 202 | 6 | 300 |
| 20 | 1,100 | 200 | 6 | 300 |
| 20 | 1,100 | 200 | 6 | 110 |
| 20 | 1,150 | 200 | 5¾ | 300 |
| 20 | 1,100 | 199 | 6 | 300 |

The 14 reaction products were bulked and filtered to provide 327 grams of filtrate. This filtrate was subjected to three simple distillations with the results shown in Table V.

TABLE V

| Fraction | Wt., g. | B.P.,° C. | Percent boron |
|---|---|---|---|
| First distillation: | | | |
| Decaborane | 22 | | |
| Decaborane and distillate mixture | 53 | | |
| Residue A | 250 | | |
| Second distillation (Residue A): | | | |
| Distillate A | 124 | 57–98/0.6–2.5 mm | 65 |
| Residue B | 126 | Resinous, non-volatile | |
| Third distillation (Distillate A): | | | |
| Cut AA | 38 | 54/0.2 mm | *65 |
| Cut BB | 38 | 55–59/0.2 mm | *63 |
| Residue C | 37 | Resinous, non-volatile | 57 |

* Two fractions were combined.

EXAMPLE VII 20 grams of decaborane having a purity of about 90 percent by weight and obtained from solids produced in the conversion of diborane to pentaborane was added to an Aminco 110 ml. stainless steel autoclave. After sealing the autoclave and placing it in the rocking mechanism, ethylene was pressured into the autoclave until the pressure reached 1150 p.s.i.g. at 20° C. The heater and rocker were then turned on.

LOG OF REACTION

| Time | Temp.,° C | Pressure, p.s.i.g. |
|---|---|---|
| [2] 11:05 | 20 | 1,150 |
| 11:35 | 110 | 2,350 |
| 12:00 | 196 | 3,400 |
| [2] 5:15 | 200 | 2,300 |

[1] A.M.   [2] P.M.

The heat was shut off at 5:15 p.m. The reaction time was 5¼ hours at 200° C. The autoclave was allowed to cool and on the next day 19 grams of slurry was removed and filtered. Analysis of the filtered liquid showed 49.4 percent boron.

This procedure was repeated six times using the conditions set forth in Table VI to provide filtered products having boron contents ranging from 49.4 to 64.1 percent by weight.

TABLE VI

| | | | | | | |
|---|---|---|---|---|---|---|
| Pressure (p.s.i.g. at room temp.) | 2,400 | 1,150 | 1,225 | 1,225 | 1,150 | 1,450 |
| Reaction time (hours) | 3 | 6 | 6 | 6 | 6 | 6 |
| Reaction temp. (° C.) | 197 | 202 | 180 | 184 | 177 | 179 |
| Decaborane (g.) | 150 | 20 | 20 | 20 | 20 | 20 |
| Aluminum chloride (g.) | 0 | 0.25 | 0.25 | 0 | 0 | 0 |
| Boron trifluoride etherate (g.) | 0 | 0 | 0 | 0 | 1.0 | 1.0 |
| Autoclave size (ml.) | 1,150 | 110 | 110 | 110 | 110 | 110 |
| Slurry (product) (g.) | 175 | 15 | 23 | 18 | 15 | 19 |

The filtered, crude products from the seven runs were bulked and the bulked liquid (weight 172.5 grams) was heated under vacuum at 40–70° C. for 3.5 hours to remove decaborane by sublimation. The bulked liquid was then subjected to two simple distillation operations. The main fraction from the first distillation which came over at a vapor temperature of 62–67° C. at an absolute pressure of 0.25–0.30 mm. of mercury weighted 90.7 grams. This main fraction was subjected to a second simple distillation and at a vapor temperature of 54–57° C. and at an absolute pressure of 0.25 mm. of mercury a liquid fraction weighing 64.6 grams and containing 67.4 percent by weight of boron as collected. It had the following properties:

Percent boron _____ 67.4.
Net heat of combustion B.t.u./lb. __ 26,000.
Viscosity in centistokes _____ 7.2 at 25° C.,
  16.8 at 0° C.,
  200 at −40° C.
Vapor pressure, mm. of Hg. _____ 1.0 at 25° C.
Specific gravity, 20/4° C. _____ 0.826.
Freezing point, ° C. _____ <−78.
$N_D^{20}$ _____ 1.5570.

EXAMPLE VIII

Part A 13 grams of decaborane having a purity of about 90 percent by weight and obtained from solids formed in the pyrolysis of diborane to produce pentaborane was added to a 110 ml. stainless steel autoclave which was then sealed and placed in a rocking mechanism. Ethylene was then pressured to the autoclave until the pressure was 2300 p.s.i.g. at 25° C. The temperature was the raised to 204° C. and held there for a reaction time of 6 hours, following which the heat was turned off and the autoclave was allowed to cool. The reaction mixture was then filtered. This procedure was repeated twice under the conditions set forth in Table VII and the three filtrates (total weight, 40 grams) were bulked.

TABLE VII

| | | |
|---|---|---|
| Decaborane (g.) | 13.0 | 20 |
| Ethylene (p.s.i.g. at 25° C.) | 2,400 | 2,500 |
| Autoclave size (ml.) | 110 | 110 |
| Reaction time (hours) | 6 | 6 |
| Reaction temperature (° C.) | 204 | 206 |

The bulked product was heated under a vacuum to remove dissolved decaborane by sublimation and was then subjected to two simple distillation operations.

In the first of these distillation operations only decaborane was removed. In the second distillation operation two cuts were taken off. Cut No. 1 (10 grams) came over at a vapor temperature of 59–74° C. and at an absolute pressure of 0.2 to 0.7 mm. of mercury. Cut No. 2 (6.5 grams) came over at a vapor temperature of 71–80° C. and at an absolute pressure of 0.2 mm. of mercury.

Part B 20 grams of decarborane having a purity of about 90 percent by weight and obtained from solids formed in the conversion of diborane to pentaborane was added to a 110 ml. stainless steel autoclave which was then sealed. Ethylene was then pressured in until the pressure was 2500 p.s.i.g. at 24° C. The heater and rocking mechanism were then turned on and the reaction temperature was held at 203° C. for a period of 6 hours, following which the autoclave was permitted to cool. Thereafter the reaction product was filtered to provide 15 grams of brown liquid.

This procedure was substantially repeated twice using in each instance an initial pressure of 2400 p.s.i.g. at 25° C.; in one of the instances the reaction temperature was 204° C., providing 22 grams of brown filtered liquid, and in the other instance the reaction temperature was 204° C. to provide 37 grams of brown filtered liquid.

The three filtrates were combined and the bulked filtrates were heated in vacuum to remove dissolved decaborane by sublimation. A simple distillation was then conducted to provide four cuts which are described in Table VIII.

TABLE VIII

| Cut No. | Weight, g. | Vapor temp., °C. | Pot temp., °C. | Absolute pressure, mm. Hg |
|---|---|---|---|---|
| 1 | 5 | 55–63 | 100–106 | 0.4 |
| 2 | 16 | 60–65 | 108–117 | 0.4 |
| 3 | 4 | 60–65 | 109–125 | 0.3 |
| 4 | 3 | 69–79 | 142–164 | 0.3 |

*Part C*

Cut No. 2 of Part A and Cut No. 1, 3, and 4 of Part B are further described in Table IX.

TABLE IX

| Sample No. | Weight (g.) | Percent boron | Boron content (g.) |
|---|---|---|---|
| Part A, Cut No. 2 | 4.0 | 53.9 | 2.4 |
| Part B, Cut No. 1 | 8.2 | 68.0 | 5.6 |
| Part B, Cut No. 3 | 2.6 | 55.4 | 1.4 |
| Part B, Cut No. 4 | 14.0 | 54.6 | 7.6 |
| Total | 28.8 |  | 17.0 |

From the combined sample, 24.7 grams was taken for fractional distillation. The distilaltion was carried out ouder reduced pressure in a Podbielniak Series 3400 distillation apparatus with "Heli-Grid" "Hastelloy B" packing at a reflux ratio of one-hundred to one. After four fractions were taken, the distillation residue began to pyrolyze, as indicated by a rapid rise in pot temperature and an increase in pressure. The distillation then was stopped.

Table X sets forth information concerning four overhead fractions taken during the distillation.

TABLE X

| Fraction | Boiling range °C. | P, mm. of Hg abs. | Weight (g.) | Molecular weight | Percent boron |
|---|---|---|---|---|---|
| 1 | 84–99 | 1.4 | 2.3 | 145.6, 135.4, 152.1, 158.6 | 71.33 |
| 2 | 68–84 | 1.2 | 7.7 | 154.3, 145.1, 149.7 | 71.46, 71.48 |
| 3 | 70–72 | 1.1 | 3.3 | 150.5, 153.4, 151.9 | 71.58, 71.62 |
| 4 | 78–83 | 2.0 | 3.1 | 151.4, 169.4, 146.3 | 67.41, 67.39 |
| Residue |  |  | 7.6 |  |  |
| Total |  |  | 24.0 |  |  |

The purest fraction obtained during the distillation was Fraction 3 which had a boiling range of 70–73° C. at an absolute pressure of 1.1 mm of mercury. This fraction was substantially pure monoethyldecaborane since it had an average molecular weight of 151.9 (150.4 theoretical) and had an average boron content of 71.6 (71.96 theoretical). Fraction 2 had an average molecular weight of 149.7 and a boron content of 71.5, indicating a very high content of monoethyldecaborane.

Various modifications can be made in the specific procedures of the examples to provide other decaborane-ethylene reaction products which fall within the scope of the present invention. As the specific examples illustrate, the relative amounts of ethylene and decaborane introduced into the reaction zone can be varied widely, but generally they are introduced into the reaction zone in a molecular ratio of ethylene to decaborane within the approximate range 0.25:1 to 30:1. Likewise, although in the specific examples reaction pressures of the order of 10,000 p.s.i.g. were attained, this operating variable can also be varied widely, for example, within the range from about 500 to 25,000 p.s.i.g. Moreover, although in the specific examples reaction temperatures of about 200° C. were utilized, the particular reaction temperature employed can nevertheless be varied somewhat. It is preferred to use reaction temperatures within the range from about 180 to 250° C. At lower reaction temperatures, the reaction does not proceed as rapidly and at higher temperatures the decaborane begins to pyrolyze rapidly, this representing a loss. Usually, the reaction time will be within the range from about 1 to 10 hours, lower ethylene pressures and lower reaction temperatures requiring longer reaction times.

The compositions produced in accordance with the present invention are liquid materials which are stable, have a low vapor pressure and have a high boron content. The boron content will vary somewhat, depending upon the particular reaction conditions employed in preparing the product and also upon the separation steps, if any, to which the liquid reaction product is subjected. In general, however, the liquid product prepared in accordance with the present invention will have a boron content within the approximate range of 35 to 80 percent by weight.

The compositions of our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the monoethyldecaborane, for example, this local fuel to air ratio by weight is approximately 0.072. For the higher energy fuels of the present invention, because of their higher heating values in comparison with the simple hydrocarbons, the overall fuel-air ratio by weight across the combustor will be approximately 0.005 to 0.016 if the resultant gas temperature is to remain within the presently established tolerable temperature limits. Thus, when used as the fuel supplied to the combustor of an aircraft gas turbine engine, the products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of aproximately 1400° F. is maintained at the turbine inlet.

The products of our invention can also be employed as aircraft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the products of our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products of our invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of our invention eliminates the need of flameholding devices within the combustion zone of the afterburner. When employed in an afterburner, the fuels of our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products of our invention will improve the combustion process of the ramjet in much the same manner as that described for the afterburner because of their improved chemical reactivity over that of simple hydrocarbon fuels. When employed in the ramjet the fuels of our invention will be simply substituted for hydrocarbon fuels and used in the established manner.

We claim:

1. A method for the preparation of a liquid reaction product of decaborane and ethylene which comprises reacting from 0.25 to 30 moles of ethylene per mole of decaborane at a pressure within the range from 500 to 25,000 p.s.i.g. at a temperature within the range from 180 to 250° C.

2. A method for the prepartion of liquid reaction product of decaborane and ethylene at a pressure below about 25,000 p.s.i.g.

No references cited.

TOBIAS E. LEVOW, *Primary Examiner.*

WILLIAM WILES, LEON ROSDOL, ROGER L. CAMPBELL, *Examiners.*

R. A. KULASON, L. A. SEBASTAIN,
*Assistant Examiners.*

UNITED STATES PATENT OFFICE
CERTIFICATE OF CORRECTION

Patent No. 3,231,622                                            January 25, 1966

Hugo Stange et al.

It is hereby certified that error appears in the above numbered patent requiring correction and that the said Letters Patent should read as corrected below.

Column 3, line 3, for "precent" read -- percent --; line 4, for "or" read -- of --; column 4, TABLE II, second column, line 10 thereof, for "1-100" read -- 1,100 --; column 5, TABLE IV, fourth column, line 4 thereof, for "2" read -- 6 --; in the table entitled "LOG OF REACTION, first column, line 1 thereof, for "$^2$11:05" read -- $^1$11:05 --; column 6, line 4, for "sublimitation" read -- sublimation --; line 13, for "as" read -- was --; line 34, for "the" read -- then --; line 50, for "sublimitation" read -- sublimation --; column 7, line 32, for "distilaltion" read -- distillation --; line 33, for "ouder" read -- under --; column 9, line 37, for "aproximately" read -- approximately --; column 10, line 45, after "ethylene" insert -- which comprises reacting decaborane and ethylene --.

Signed and sealed this 13th day of December 1966.

(SEAL)
Attest:

ERNEST W. SWIDER                                        EDWARD J. BRENNER
Attesting Officer                                      Commissioner of Patents

UNITED STATES PATENT OFFICE
CERTIFICATE OF CORRECTION

Patent No. 3,231,622          January 25, 1966

Hugo Stange et al.

It is hereby certified that error appears in the above numbered patent requiring correction and that the said Letters Patent should read as corrected below.

Column 3, line 3, for "precent" read -- percent --; line 4, for "or" read -- of --; column 4, TABLE II, second column, line 10 thereof, for "1-100" read -- 1,100 --; column 5, TABLE IV, fourth column, line 4 thereof, for "2" read -- 6 --; in the table entitled "LOG OF REACTION, first column, line 1 thereof, for "$^2$11:05" read -- $^1$11:05 --; column 6, line 4, for "sublimitation" read -- sublimation --; line 13, for "as" read -- was --; line 34, for "the" read -- then --; line 50, for "sublimitation" read -- sublimation --; column 7, line 32, for "distilaltion" read -- distillation --; line 33, for "ouder" read -- under --; column 9, line 37, for "aproximately" read -- approximately --; column 10, line 45, after "ethylene" insert -- which comprises reacting decaborane and ethylene --.

Signed and sealed this 13th day of December 1966.

(SEAL)
Attest:

ERNEST W. SWIDER
Attesting Officer

EDWARD J. BRENNER
Commissioner of Patents